United States Patent
Desbrun et al.

(10) Patent No.: US 7,061,483 B2
(45) Date of Patent: Jun. 13, 2006

(54) METHODS FOR COMPUTING BARYCENTRIC COORDINATES GENERALIZED TO IRREGULAR N-GONS AND APPLICATIONS OF THE SAME

(75) Inventors: Mathieu Desbrun, Pasadena, CA (US); Alan H. Barr, Pasadena, CA (US); Mark Meyer, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 311 days.

(21) Appl. No.: 10/071,268

(22) Filed: Feb. 7, 2002

(65) Prior Publication Data

US 2003/0011589 A1    Jan. 16, 2003

Related U.S. Application Data

(60) Provisional application No. 60/267,804, filed on Feb. 8, 2001.

(51) Int. Cl.
*G06T 15/00* (2006.01)
(52) U.S. Cl. ...................... 345/419; 345/427
(58) Field of Classification Search ................ 345/419, 345/427, 619, 625, 627
See application file for complete search history.

(56) References Cited

OTHER PUBLICATIONS

Desbrun et al., Implicit Fairing of Irregular Meshes using Diffusion and Curvature Flow, Siggraph 1999, pp. 317-324.*

Eck et al., Multiresolution Analysis of Arbitrary Meshes, ACM 1995, pp. 173-182.*

Mark Meyer, Haeyoung Lee, Alan Barr, Mathieu Desbrun, Caltech—USC, *Generalizing Barycentric Coordinates to Irregular N-gons* Nov. 2002, Journal Graphics Tool v. 7, Ab. 1.

Mark Meyer, Haeyoung Lee, Alan Barr, Mathieu Desbrun, Caltech—USC, *Intrinsic Parameterization of Surface Meshes* Sep. 2002, EURO graphics 02, conference 2002.

* cited by examiner

*Primary Examiner*—Phu K. Nguyen
(74) *Attorney, Agent, or Firm*—Howrey LLP (57) ABSTRACT

A method for deriving barycentric coordinates for a point p within an n-sided polygon is provided wherein, for a particular coordinate $w_j$, corresponding to the vertex $q_j$, the method embodies a formula which depends only on the edge $pq_j$, and the two adjacent angles $\delta_j$ and $\gamma_j$. Similarly, a method is provided for deriving weights $w_{ij}$ for expressing a vertex $q_i$ in a mesh representation of an object surface in terms of its one-ring neighbors $q_j$, $\forall j \in N(i)$. For a particular vertex $q_i$, and neighbor vertex $q_j$, this method embodies a formula which depends only on the edge $q_i q_j$, and the two adjacent angles $\delta_j$ and $\gamma_j$. A method of parameterizing a mesh representation of an object surface using the latter formula is also provided. This method begins with the step of computing the weights $w_{ij}$ in 3D space (in contrast to parameter space) for each of the vertices in the mesh representation. For a vertex i, i∈[1 . . . n], the weights $w_{ij}$ allow the vertex i to be expressed in terms of its one-ring neighbors j∈N(i). The method then proceeds to parameterizing the mesh representation responsive to the weights $w_{ij}$.

11 Claims, 6 Drawing Sheets

FIGURE 6 dez
METHODS FOR COMPUTING BARYCENTRIC COORDINATES GENERALIZED TO IRREGULAR N-GONS AND APPLICATIONS OF THE SAME This application claims the benefit of U.S. Provisional Application No. 60/267,804, filed Feb. 8, 2001, which is hereby fully incorporated by reference herein as though set forth in full.

The U.S. Government has certain rights in this invention pursuant to Grant number ASC-89-20219 awarded by the National Science Foundation.

FIELD OF THE INVENTION

This invention relates generally to the field of barycentric coordinates for representing interior points of polygons in terms of their boundary vertices, and, more specifically, methods of computing such coordinates, and applications of such coordinates.

RELATED ART

Barycentric coefficients are useful for representing interior points of a polygon in terms of the polygon vertices. Barycentric coordinates are weights which, when applied to the vertices of a polygon, and the results added, yield the interior point.

Methods for computing triangular barycentric coordinates have been known for centuries, but efforts to generalize these methods to n-sided polygons have not been entirely successful, in part because the formulations resulting from these efforts are subject to one or more weaknesses which limit their effectiveness and applicability.

For example, in Eugene L. Wachspress, "A Rational Finite Element Basis", Mathematics in Science and Engineering, Volume 114, Academic Press, 1975, a method for computing barycentric coordinates for n-sided polygons is disclosed which can be explained with reference to FIG. 1.

Figure 1:
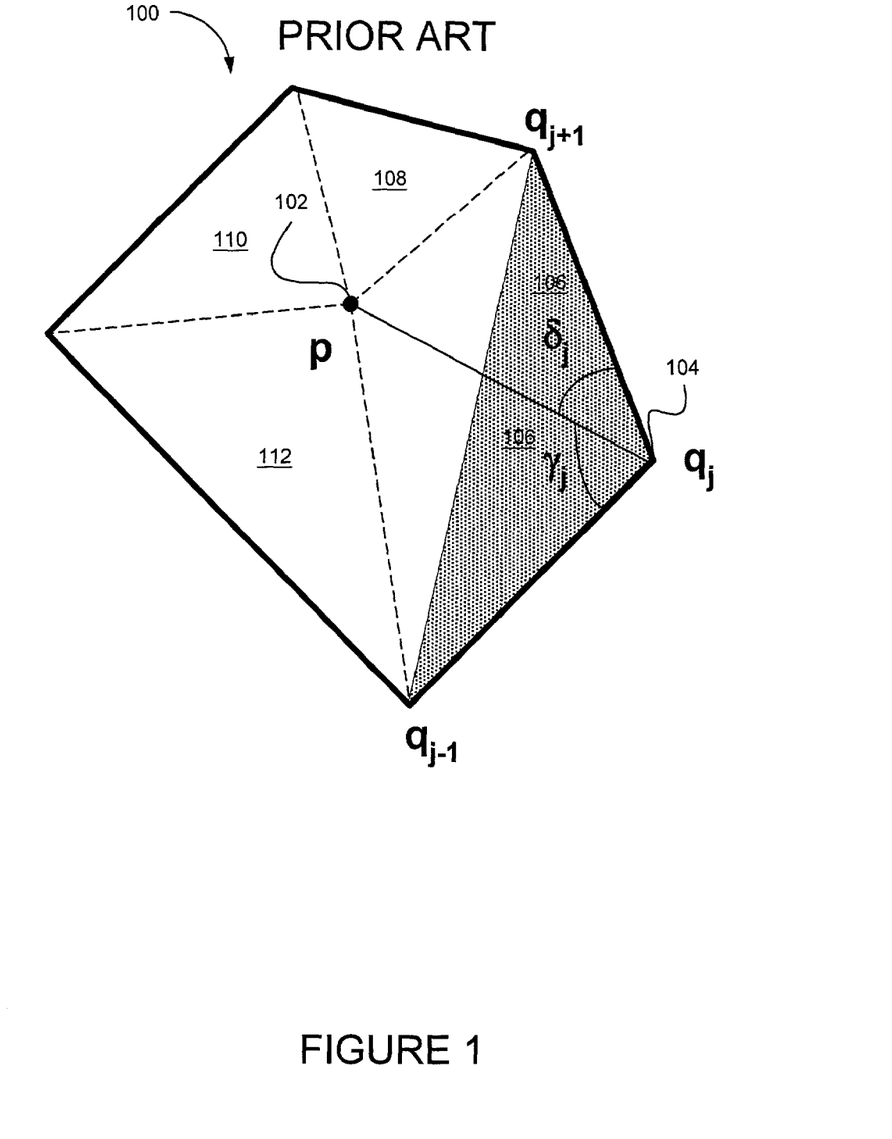
FIG. 1 illustrates a representation of an n-sided polygon partitioned into triangles useful for computing the barycentric coordinates of a point p using the prior art formula of Wachpress.

Referring to FIG. 1, n-sided polygon 100 is illustrated, and it is desired to compute the barycentric coordinates for the interior point p, identified in the figure with numeral 102, in terms of the vertices of polygon 100. As is known, for an n-sided polygon, there will be n barycentric coordinates for an interior point, one corresponding to each of the n vertices. These barycentric coordinates, which can be referred to as $\alpha_j$, $\forall j$, $j \in [1 \ldots n]$, are such that the following relationship holds:

$$p = \sum_{j \in [1,\ldots,n]} \alpha_j q_j \qquad (1)$$

where $\alpha_j$ refers to the barycentric coordinate applied to the vertex $q_j$. (As used herein, a bolded item refers to a vector, while an unbolded item refers to a scalar).

According to the technique proposed by Wachspress, a weight $W_j$ for vertex $q_j$ is derived from the product of the area of the triangle 106 (shaded in FIG. 1) formed by the three adjacent vertices $q_{j+1}$, $q_j$, and $q_{j-1}$ and the areas of the n−2 interior triangles, identified with numerals 108, 110, and 112, formed by the point p and the polygon's adjacent vertices (but excluding the two interior triangles that contain the vertex $q_j$). Mathematically, this formulation may be expressed as follows:

$$w_j = A(q_{j-1}, q_j, q_{j+1}) \bullet \Pi_{k \notin \{j, j+1\}} A(q_{k-1}, q_k, p) \qquad (2)$$

where the function A refers to the area of the triangle whose vertices are the arguments of the function.

This formulation is then repeated for each of the vertices in the polygon. The resulting weights may then be normalized in accordance with the following expression to form the barycentric coordinates for the point p:

$$\alpha_j = \frac{w_j}{\left(\sum_k w_k\right)} \qquad (3)$$

This formulation, however, is complex since the computation of the barycentric coordinate corresponding to a particular vertex depends on all the vertices of the polygon, and entails repetitive computations of triangle areas. Consequently, the formulation is computationally intensive and therefore unacceptable for applications where a faster approach is needed.

SUMMARY

In a first embodiment, the invention provides a method for deriving barycentric coordinates for a point p within an n-sided polygon. For a particular coordinate $w_j$, corresponding to the vertex $q_j$, this method embodies a formula which depends only on the edge $pq_j$, and the two adjacent angles $\delta_j$ and $\gamma_j$. This formula may be expressed as follows:

$$w_j = \frac{\cot(\gamma_j) + \cot(\delta_j)}{\|p - q_j\|^2} \qquad (4)$$

This computation may be repeated for each of the n polygon vertices to result in barycentric coordinates corresponding to each of the n vertices. If necessary, the coordinates may then be normalized using expression (3).

In one implementation, for accuracy reasons, the cotangent function used in this formula is not computed through a trigonometric function call. Instead, in this implementation, the cotangent is derived from a division between the dot product of two vectors derived from the triangle involved, and the cross product of these two vectors. In particular, for a triangle having vertices abc, the cotangent of the angle at vertex b may be derived using the following formulation:

$$\frac{bc \cdot ba}{\|bc \times ba\|} \qquad (5)$$

where ba is the vector a-b, and bc is the vector c-b.

In a second embodiment, the invention provides a method for deriving weights $w_{ij}$ for expressing a vertex i in a mesh representation of an object surface in terms of its one-ring neighbors $j \in N(i)$. For a particular vertex $q_j$, this method embodies a formula which depends only on the edge $q_i q_j$, and the two adjacent angles $\delta_j$ and $\gamma_j$. This formula may be expressed as follows:

$$w_{ij} = \frac{\cot(\gamma_j) + \cot(\delta_j)}{\|q_i - q_j\|^2} \qquad (6)$$

This computation may be repeated for each of the vertices in the mesh representation to result in weights allowing each of the vertices to be expressed in terms of its one-ring neighbors. Normalized weights may then be derived from non-normalized weights using an expression analogous to expression (3).

In a third embodiment, the invention provides a method of parameterizing a mesh representation of an object surface using the formulation expressed in (6). This method begins with the step of computing the weights $w_{ij}$ in 3D space (in contrast to parameter space) for each of the vertices in the mesh representation. For a vertex i, $i \in [1 \ldots n]$, the weights $w_{ij}$ allow the vertex i to be expressed in terms of its one-ring neighbors $j \in N(i)$.

Once the weights have been derived, the method proceeds to fixing the positions of boundary vertices in parameter space, such as by assigning each of these vertices a position on a fixed boundary C. For a boundary vertex i, the position assigned to this vertex in parameter space may be referred to as $C_{u_i}$.

Then, the method proceeds to solving the following system of linear equations in order to derive the parameterization of the mesh representation:

$$\forall i, i \in [1 \ldots n], \begin{Bmatrix} \sum_{j \in N(i)} w_{ij}(u_i - u_j) = 0 & \text{if } i \text{ is an interior vertex} \\ u_i = C_{u_i} & \text{if } i \text{ is a boundary vertex} \end{Bmatrix} \quad (7)$$

where $u_i$ is the vertex i in parameter space (and $u_j$ is the vertex j in parameter space), and $C_{u_i}$ is the boundary position in parameter space assigned to the boundary vertex i.

The result of solving this system of linear equations is the coordinates $u_i$ of each of the vertices i in parameter space, $i \in [1 \ldots n]$.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

As utilized herein, terms such as "about" and "substantially" are intended to allow some leeway in mathematical exactness to account for tolerances that are acceptable in the trade, e.g., any deviation upward or downward from the value modified by "about" or "substantially" by any value in the range(s) from 1% to 20% of such value.

Figure 2:
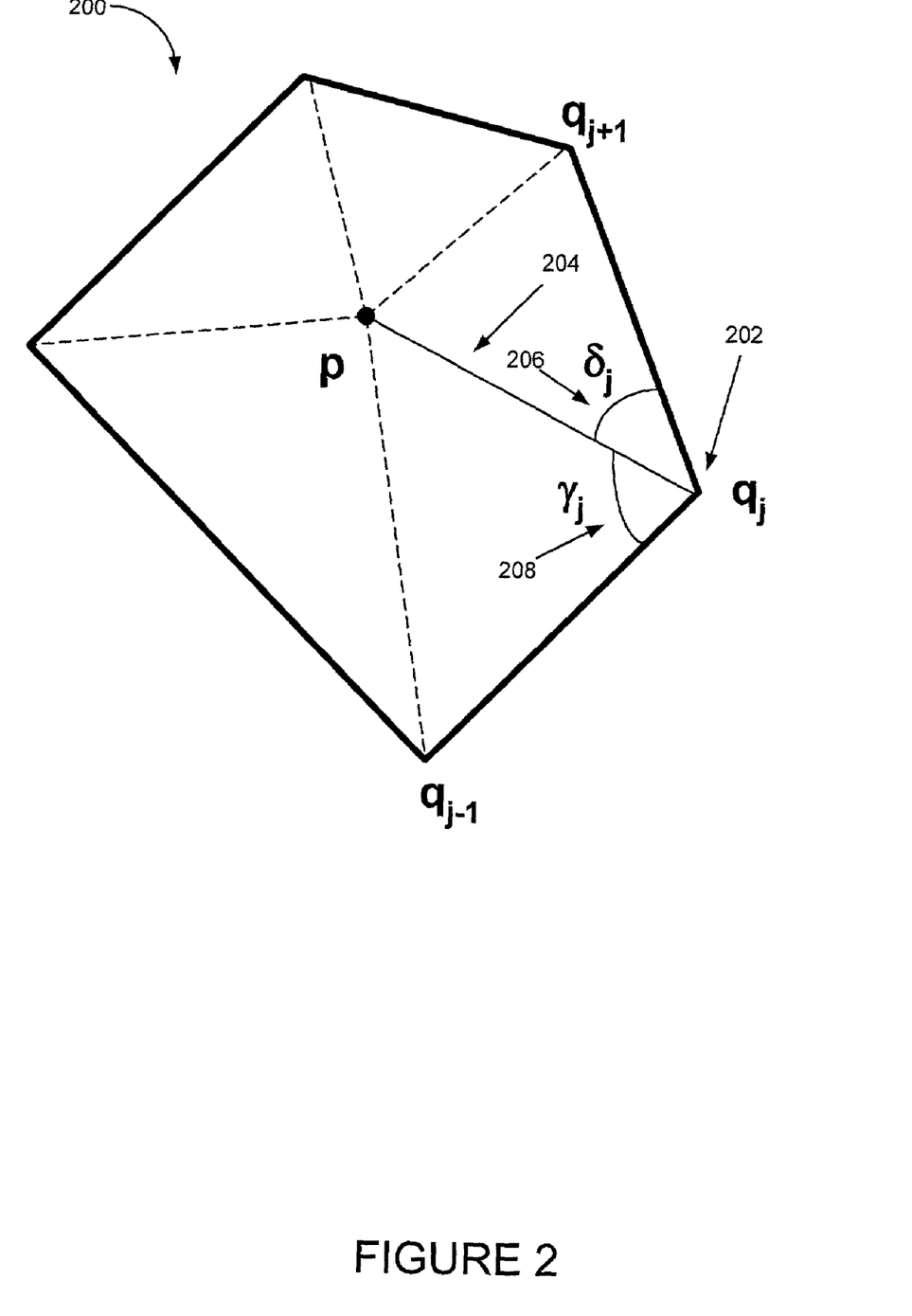
FIG. 2 illustrates a representation of an n-sided polygon showing the edge $pq_j$ and the adjacent angles $\delta_j$ and $\gamma_j$ useful for computing the barycentric coordinates of a point p using a method according to the invention.

Referring to FIG. 2, in a first embodiment of the invention, a method for deriving non-normalized barycentric coordinates for a point p within an n-sided polygon is provided. For a particular coordinate $w_j$, corresponding to the vertex $q_j$, identified with numeral 202, this method embodies a formula which depends only on the edge $pq_j$, identified with numeral 204, and the two adjacent angles $\delta_j$ and $\gamma_j$, identified respectively with numerals 206 and 208. This formula may be expressed as follows:

$$w_j = \frac{\cot(\gamma_j) + \cot(\delta_j)}{\|p - q_j\|^2} \quad (8)$$

This computation may be repeated for each of the n polygon vertices to result in non-normalized barycentric coordinates corresponding to each of the n vertices. Normalized coordinates may then be derived from the non-normalized coordinates using the following expression:

$$\alpha_j = \frac{w_j}{\left(\sum_k w_k\right)} \quad (9)$$

Compared to the Wachpress formulation (2), this formulation has the advantage that it is local and hence computationally simple: only the edge $pq_j$ and its two adjacent angles $\delta_j$ and $\gamma_j$ are needed.

The coordinates derived from this formula possess several desirable properties. First, they satisfy the following affine combination property:

$$p = \sum_{j \in [1 \ldots n]} \alpha_j q_j, \text{ with } \sum_{j \in [1 \ldots n]} \alpha_j = 1 \quad (10)$$

This property may be expressed in the following form using the non-normalized coordinates $w_j$:

$$\sum_{j \in [1 \ldots n]} w_j(q_j - p) = 0 \quad (11)$$

Second, the coordinates $\{\alpha_j\}_{j=1 \ldots n}$ (and the normalized coordinates) are smoothly dependent on p and the vertices of the polygon. This ensures smoothness in the variation of the position of p responsive to any movement in the vertex $q_j$.

Third, if the polygon is convex, the coordinates $\{\alpha_j\}_{j=1\ldots n}$ satisfy the following convex combination property:

$$\alpha_j \geq 0 \forall j \epsilon [1 \ldots n] \qquad (12)$$

This guarantees no under- and over-shooting in the coordinates: all the coordinates will be between zero and one.

Figure 3:
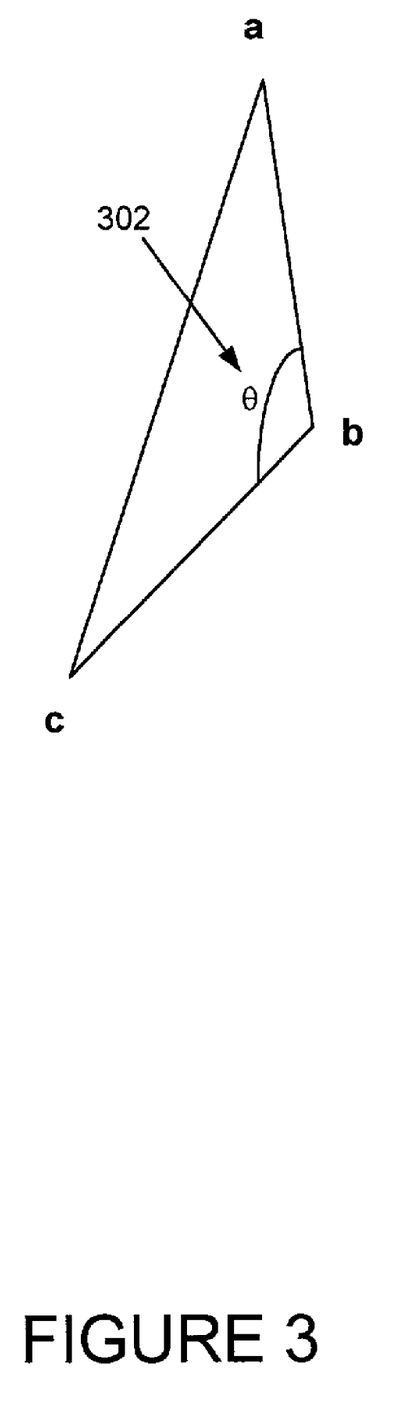
FIG. 3 illustrates parameterization of a mesh representation of an object surface.

In one implementation, for accuracy reasons, the cotangent function used in the formula (7) is not computed through a trigonometric function call. Instead, in this implementation, the cotangent is derived from a division between the dot product of two vectors derived from the triangle involved, and the cross product of these two vectors. In particular, referring to FIG. 3, for a triangle having vertices abc, the cotangent of the angle θ at vertex b, which angle is identified with numeral 302, may be derived using the following formulation:

$$\frac{bc \cdot ba}{\|bc \times ba\|} \qquad (13)$$

where ba is the vector a-b, and bc is the vector c-b.

In one example, the formula (8) may be implemented using the following pseudo-code:

```
// Compute the barycentric weights for a point p in an n-gon Q
// Assumes p is strictly within Q and the vertices q_j are ordered.
computeBarycentric(vector2d p, polygon Q, int n, real w[ ])
    weightSum = 0
    foreach vertex q_j of Q:
        prev = (j + n - 1) mod n
        next = (j + 1) mod n
        w_j = (cotangent(p, q_j, q_prev) + (cotangent(p, q_j, q_next)/||p - q_j||²
        weightSum += w_j
// Normalize the weights
foreach weight w_j:
    w_j /= weightSum
// Compute the cotangent of the non-degenerate triangle abc at vertex b
cotangent(vector2d a, vector2d b, vector2d c)
    vector2d ba = a - b
    vector2d bc = c - b
```

$$\text{return} \left( \frac{bc \cdot ba}{\|bc \times ba\|} \right)$$

The formula (8), any derivation thereof, and any instructions or program code implementing the same, may be tangibly embodied, through storage or otherwise, on or in a processor readable medium or memory including but not limited to RAM, ROM, PROM, EPROM, EEPROM, hard disk, floppy disk, CD-ROM, DVD, flash memory, etc. For purposes of this disclosure, the term "memory" refers to any medium which is capable of storing data.

Figure 4:
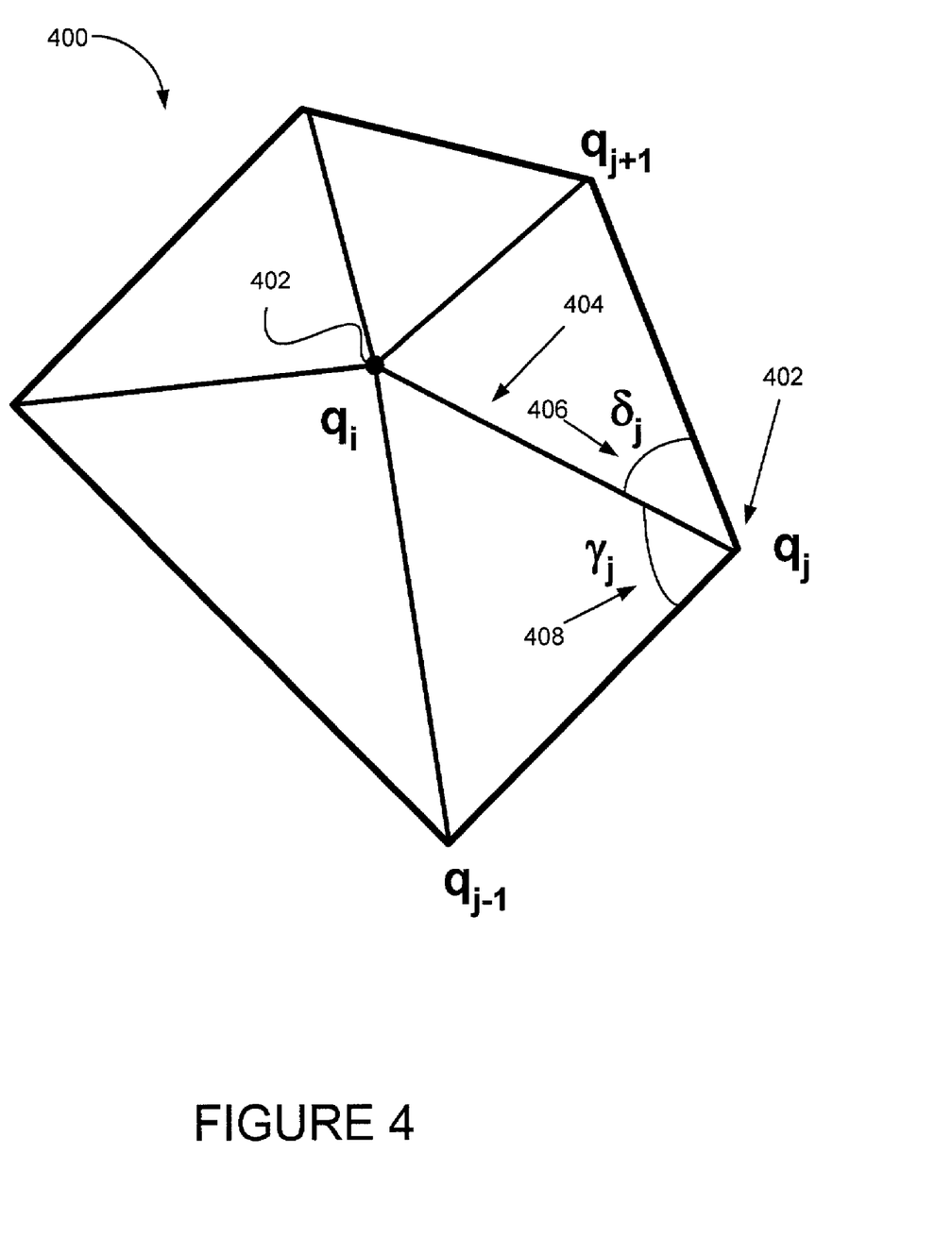
FIG. 4 illustrates application of a method according to the invention to computing weights for expressing a vertex of a mesh representation in terms of its one-ring neighbors.

Referring to FIG. 4, in a second embodiment of the invention, a method is provided for deriving weights $w_{ij}$ for expressing a vertex $q_i$ in a mesh representation 400 of an object surface in terms of its one-ring neighbors $q_j$, $\forall j \epsilon N(i)$. For a particular vertex $q_i$, identified with numeral 402, and a neighbor vertex $q_j$, identified with numeral 402, this method embodies a formula which depends only on the edge $q_iq_j$, identified with numeral 404, and the two adjacent angles $\delta_j$ and $\gamma_j$, identified respectively with numerals 406 and 408. This formula may be expressed as follows:

$$w_{ij} = \frac{\cot(\gamma_j) + \cot(\delta_j)}{\|q_i - q_j\|^2} \qquad (14)$$

This computation may be repeated for each of the one-ring neighbors of $q_i$ resulting in weights allowing the vertex $q_i$ to be expressed in terms of its one-ring neighbors. Normalized weights may then be derived from non-normalized weights using an expression analogous to expression (9).

This series of computations may be repeated for each of the other vertices in the mesh representation, thus allowing each vertex to be expressed in terms of its one-ring neighbors.

Thus, in contrast to the previous embodiment which concerned expressing an interior point of an n-sided polygon in terms of its vertices, in this embodiment, a vertix of an n-sided polygon may be expressed in terms of its one-ring neighbors, which may be vertices of the same or a different polygon.

The formula (14), any derivation thereof, and any instructions or program code implementing the same, may be tangibly embodied, through storage or otherwise, on or in a processor readable medium or memory including but not limited to RAM, ROM, PROM, EPROM, EEPROM, hard disk, floppy disk, CD-ROM, DVD, flash memory, etc.

Figure 5:
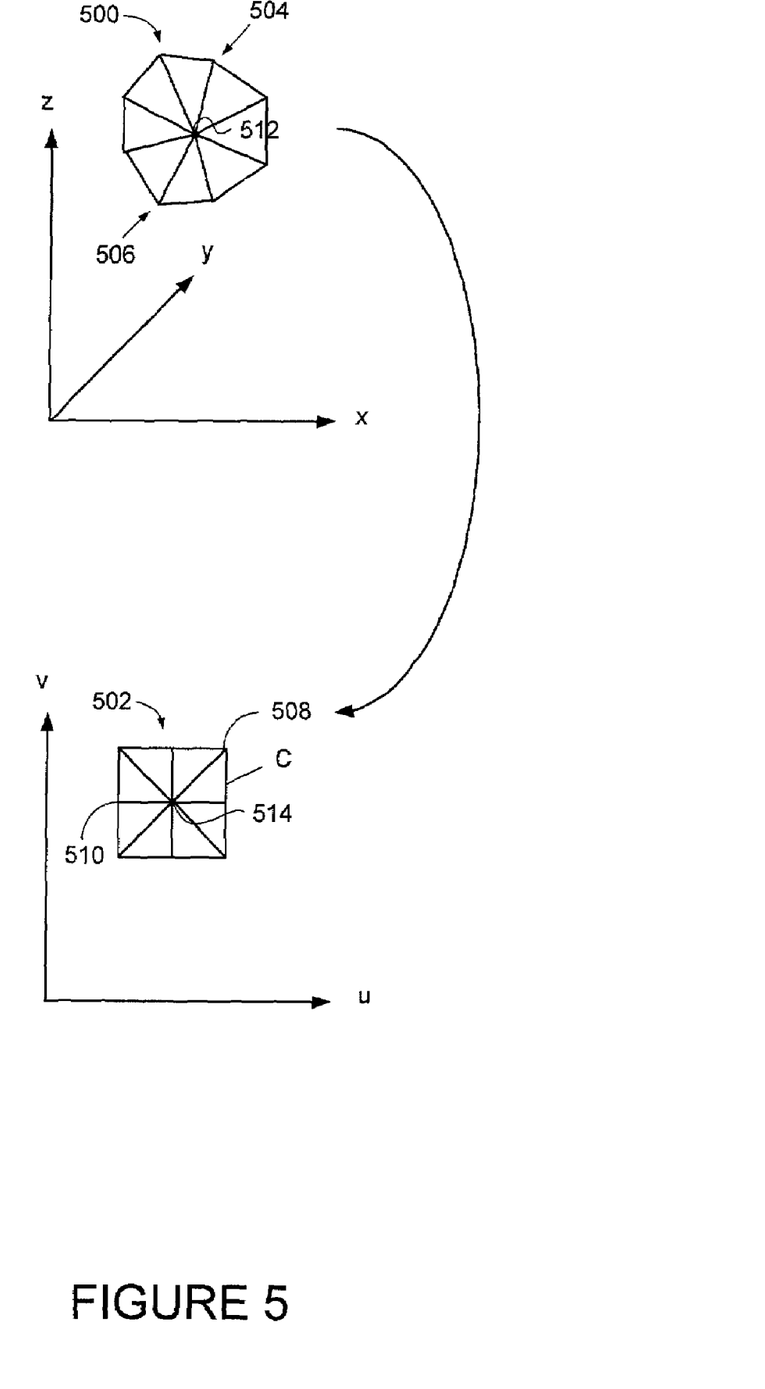
FIG. 5 illustrates the vectors and triangle vertices which are useful in computing the cotangent of one of the vertex angles according to a method which avoids a trigonometric function call.

In a third embodiment, the invention provides a method of parameterizing a mesh representation of an object surface using the formula (14). Referring to FIG. 5, parameterization is a transformation of a mesh representation 500 from 3D (x, y, z) space to parameter (u, v) space, and is performed to ease data manipulation and to achieve a better sampling of the original object surface than is achieved through the 3D mesh representation. The mesh representation, after being mapped into the parameter space, is identified with numeral 502.

Figure 6:
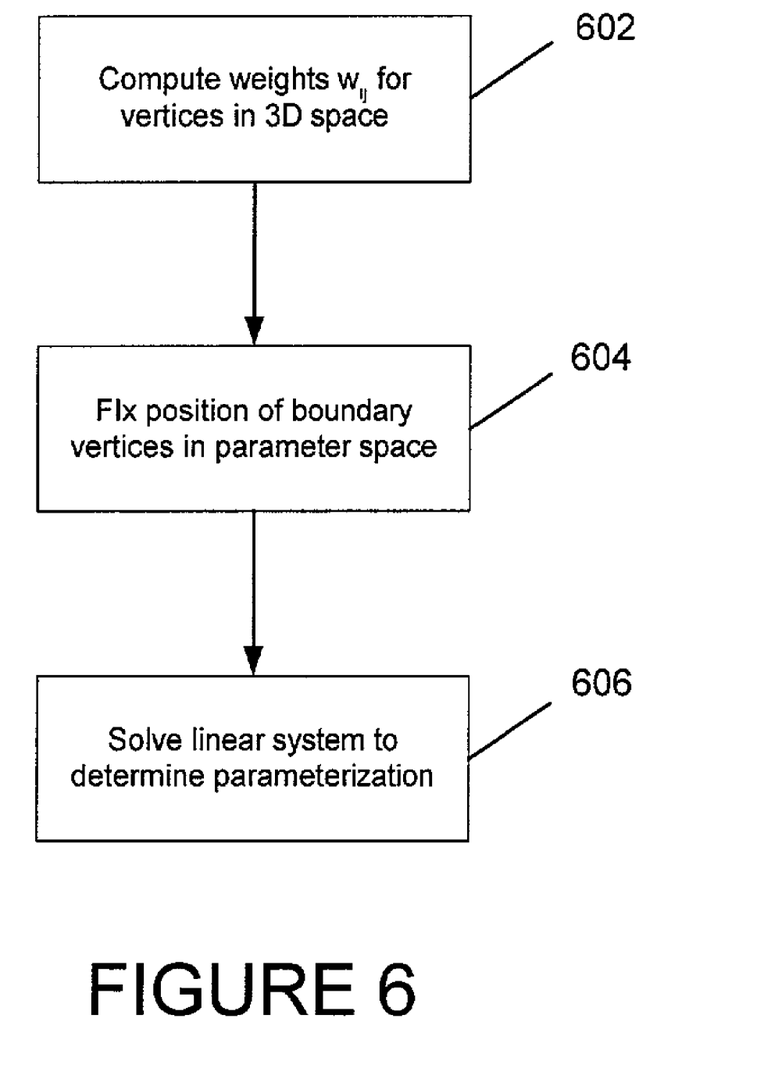
FIG. 6 is a simplified flowchart illustrating one embodiment of a method of parameterizing a mesh representation of an object surface using a formula according to the invention.

FIG. 6 illustrates a flowchart of the method. Referring to FIG. 6, the method begins with step 602, which comprises computing the weights $w_{ij}$ in 3D space (in contrast to parameter space) for each of the vertices in the mesh representation. For a vertex $q_i$, $i \epsilon [1 \ldots n]$, the weights $w_{ij}$ are derived through application of the formula (14).

Once the weights have been derived, the method proceeds to step 604, which comprises fixing the positions of boundary vertices in parameter space, such as by assigning each of these vertices a position on a fixed boundary C. For a boundary vertex i, the position assigned to this vertex in parameter space may be referred to as $C_{u_i}$. Thus, in the example illustrated in FIG. 5, the contour C is fixed in parameter space, and each of the boundary vertices of the mesh representation 500 is assigned a position on the contour C. For example, the vertex 504 may be assigned the position 508 on contour C, and the vertex 506 may be assigned the position 510 on contour C.

Then, the method proceeds to step 606, which comprises solving the following system of linear equations in order to derive the parameterization of the mesh representation:

$$\forall i, i \in [1\ldots n], \begin{cases} \sum_{j \in N(i)} w_{ij}(u_i - u_j) = 0 & \text{if } i \text{ is an interior vertex} \\ u_i = C_{u_i} & \text{if } i \text{ is a boundary vertex} \end{cases} \qquad (15)$$

where $u_i$ is the vertex i in parameter space (and $u_j$ is the vertex j in parameter space), and $C_{u_i}$ is the boundary position in parameter space assigned to the boundary vertex i.

The result of solving this system of linear equations is the coordinates $u_i$ of each of the vertices in parameter space, $i\epsilon[1 \ldots n]$. In the example of FIG. 5, this step yields the coordinates of the vertex 512 in parameter space (which coordinates are identified with numeral 514).

For additional information on parameterization, and the application of formula (14) to parameterization, the reader is referred to Mathieu Desbrun et al. "Intrinsic Parameterization of Surface Meshes," pp. 1–8, submitted for publication in EUROGRAPHICS 2002, and hereby fully incorporated herein by reference as through set forth in full. See also Mathieu Desbrun et al., "Generalizing Barycentric Coordinates to Irregular N-gons," pp. 1–5, submitted for publication in EUROGRAPHICS 2002, and hereby fully incorporated herein by reference as through set forth in full.

The foregoing method may be tangibly embodied, through storage of instructions, program code, or the like implementing the method or otherwise, on or in a processor readable medium or memory including but not limited to RAM, ROM, PROM, EPROM, EEPROM, hard disk, floppy disk, CD-ROM, DVD, flash memory, etc.

While various embodiments of the invention have been described, it will be apparent to those of ordinary skill in the art that many more embodiments and implementations are possible that are within the scope of this invention.

What is claimed is:

1. A method tangibly embodied on or in a memory for deriving barycentric coordinates for a point p within an n-sided polygon, wherein, for a particular coordinate $w_j$, corresponding to a vertex $q_j$, the method embodies a formula which may be expressed as follows:

$$w_j = \frac{\cot(\gamma_j) + \cot(\delta_j)}{\|p - q_j\|^2}$$

where $\delta_j$ and $\gamma_j$ are adjacent angles to the edge $pq_j$ at the vertex $q_j$.

2. The method of claim 1 wherein a series of instructions or program code embodying the method is stored in a memory.

3. A method tangibly embodied on or in a memory for deriving weights $w_{ij}$ for expressing a vertex $q_j$ in a mesh representation of an object surface in terms of its one-ring neighbors $q_j, \forall j \epsilon N(i)$, wherein, for a particular weight $w_{ij}$, corresponding to a vertex $q_j$, the method embodies a formula which may be expressed as follows:

$$w_{ij} = \frac{\cot(\gamma_j) + \cot(\delta_j)}{\|q_i - q_j\|^2}$$

where $\delta_j$ and $\gamma_j$ are adjacent angles to the edge $q_i q_j$ at the vertex $q_j$.

4. The method of claim 3 wherein a series of instructions or program code embodying the method is stored in a memory.

5. A processor readable medium tangibly embodying a method of parameterizing a mesh representation of an object surface, the method comprising the steps of:

for one or more vertices $q_i$ of the mesh representation, computing for one or more of its one-ring neighbors $q_j$, $\forall j \beta N(i)$, a weight $w_{ij}$ in accordance with the following formula:

$$w_{ij} = \frac{\cot(\gamma_j) + \cot(\delta_j)}{\|q_i - q_j\|^2}$$

where $\delta_j$ and $\gamma_j$ are adjacent angles to the edge $q_i q_j$ at the vertex $q_j$; and responsive to one or more of the weights $w_{ij}$ determined in the foregoing step, determining the parameterized coordinates of one or more of the vertices of the mesh representation.

6. The medium of claim 5 wherein the method further comprises fixing the positions of one or more boundary vertices in parameter space.

7. The method medium of claim 6 wherein the method further comprises assigning each of these vertices a position on a fixed boundary C, where the position on the fixed boundary C assigned to a vertex i may be referred to as $C_{u_i}$.

8. The medium of claim 7 wherein the method further comprises solving the following system of linear equations in order to derive the parameterization of the mesh representation:

$$\forall i, i \in [1 \ldots n], \left\{ \begin{array}{ll} \sum_{j \in N(i)} w_{ij}(u_i - u_j) = 0 & \text{if } i \text{ is an interior vertex} \\ u_i = C_{u_i} & \text{if } i \text{ is a boundary vertex} \end{array} \right\}$$

where $u_i$ is the vertex i in parameter space (and $u_j$ is the vertex j in parameter space), and $C_{u_i}$ is the boundary position in parameter space assigned to the boundary vertex i.

9. A processor readable medium tangibly embodying a method of parameterizing a mesh representation of an object surface, the method comprising the steps of:

a step for computing, for one or more vertices $q_i$ of the mesh representation and one or more of its one-ring neighbors $q_j, \forall j \epsilon N(i)$, a weight $w_{ij}$ in accordance with the following formula:

$$w_{ij} = \frac{\cot(\gamma_j) + \cot(\delta_j)}{\|q_i - q_j\|^2}$$

where $\delta_j$ and $\gamma_j$ are adjacent angles to the edge $q_i q_j$ at the vertex $q_j$; and a step for determining, responsive to one or more of the weights $w_{ij}$ determined in the foregoing step, the parameterized coordinates of one or more of the vertices of the mesh representation.

10. The medium of any of claims 5–9 wherein the method is embodied as instructions or program code stored in a memory.

11. The medium of claim 10 wherein the memory is selected from the group comprising RAM, ROM, PROM, EPROM, EEPROM, hard disk, floppy disk, CD-ROM, DVD, and flash memory.

* * * * *